July 15, 1930.   M. G. ALLGEYER   1,770,826
ADJUSTABLE SEAT FOR AUTOMOBILES
Filed June 4, 1928   2 Sheets-Sheet 1

Inventor
M. G. Allgeyer
By Wilkinson & Ginota
Attorneys

Inventor
M. G. Allgeyer
By Wilkinson & Ginsta
Attorneys

Patented July 15, 1930

1,770,826

UNITED STATES PATENT OFFICE

MARION GUSTINE ALLGEYER, OF NEW ORLEANS, LOUISIANA

ADJUSTABLE SEAT FOR AUTOMOBILES

Application filed June 4, 1928. Serial No. 282,713.

The present invention relates to improvements in adjustable seats, and more particularly relates to an adjustable seat for automobiles, aeroplanes and other vehicles, whereby the seat may be lengthened or shortened to promote comfort of the user.

It is an object of the invention to provide an adjustable seat in which the back is also subject to angular adjustment and in which provision is made for enabling the adjustment to be made quickly and with facility.

Another object of the invention is to provide an improved adjustable seat in which the parts are simply and compactly constructed and in which the mechanism is accessible.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side view of an adjustable seat constructed according to the present invention.

Figure 1:
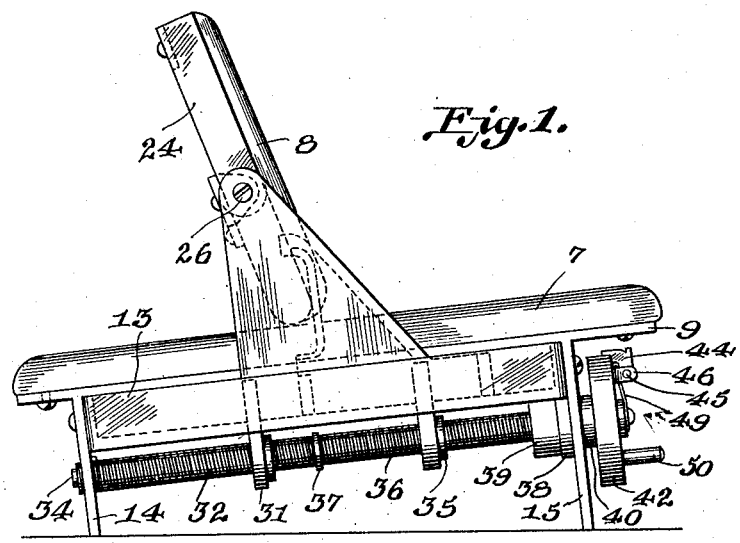
Figure 2:
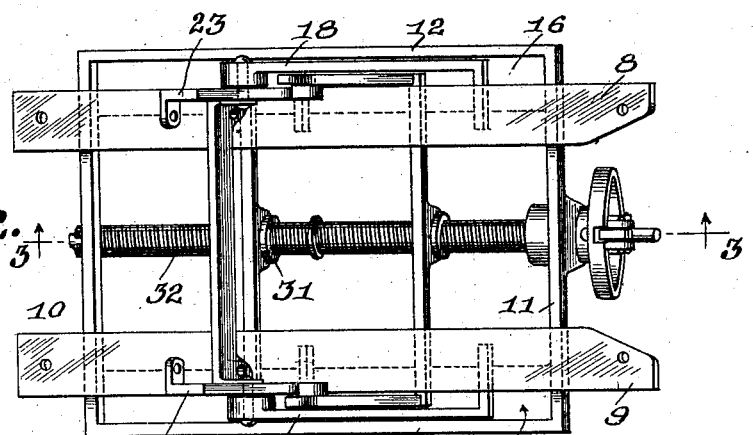
Figure 2 is a top plan view thereof with the cushions removed.

Referring more particularly to the drawings 7 designates the seat cushion and 8 the back cushion.

The seat cushion is secured by appropriate fastenings onto a seat frame which may be constructed in any suitable manner. For instance the cushion is secured upon two parallel spaced rails 8 and 9 which are supported upon the end cross bars 10 and 11. These cross bars together with the side bars 12 and 13 form a rectangular open framework supported upon the rear legs 14 and the front legs 15, which are so relatively selected as to height as to preferably give the seat cushion 7 an inclination from its forward edge downwardly toward its rear edge.

Figures 5, 6:
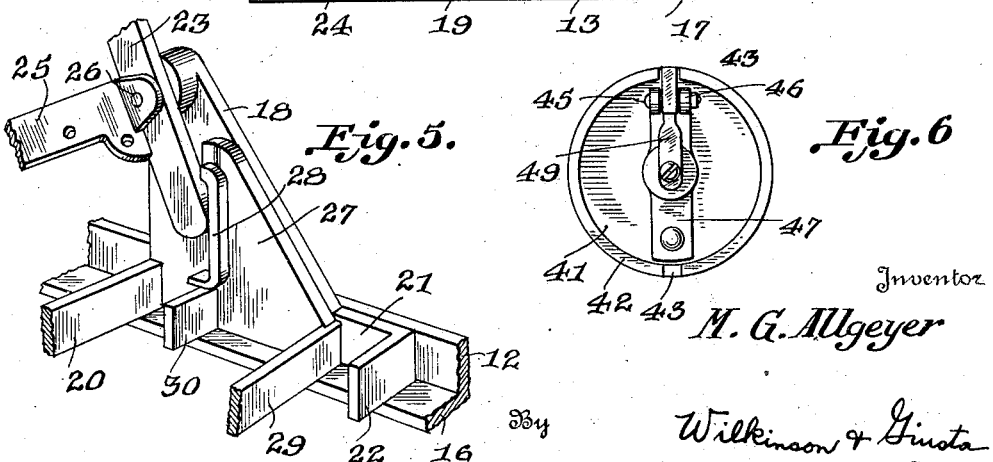
Figure 5 is a fragmentary perspective view showing a detail.
Figure 6 is a front view of the operating mechanism.

The side bars 12 and 13 are preferably of angle iron form in cross section as indicated in Figure 5. The horizontal webs 16 and 17 form supports for slidably receiving the adjustable back frame members 18 and 19. These members are preferably triangular in cross section and they are connected at their rear portions by a cross beam 20. At their forward lower projecting corner portions the back frame members are provided with extension pieces 21 having angularly in-turned terminal ends 22, which lie across the web portions of the sides of the seat frame. The back frame is made up in any suitable way, for instance, of the side styles 23 and 24 and of the cross member 25. The back frame is hinged or pivoted, as indicated at 26 to the upper ends of the back frame triangular members 18 and 19 and the back is angularly adjusted about this fulcrum point.

Within the back frame members 18 and 19 and slidably supported upon the webs 16 are the adjusting members 27, which are also preferably substantially triangular in shape and have curved and flanged rear edges 28 for receiving the lower ends of the side styles 23 and 24. The adjusting members 27 are connected together at their forward ends by the cross beam 29. At their rear ends they are provided with the in-turned lugs 30.

The beam 20 carries the traveling nut 31 engaged by a threaded sleeve 32 secured as by a set screw 33 or other means to rotate at all times with the drive or adjusting shaft 34. The cross member 29 is provided with the traveling nut 35 engaging the threads upon the threaded sleeve 36 which is loosely mounted over the forward portion of the adjusting shaft 34 and is separated from the fixed threaded sleeve 32 by a washer 37. A downwardly projecting web 38 on the frame member 11 receives therethrough both the shaft 34 and the forward unthreaded plane portion of the sleeve 36. A set collar 39 is affixed to the sleeve 36 within the web 38 and a similar collar 40 is affixed to the sleeve on the outside of the web 38, so that the shaft 34 and the sleeve are properly supported and prevented from axial movement. The set collar 40 carries therewith a disc 41 having an out-turned flange 42 in one portion of which is provided a notch 43 adapted to receive a dog 44 pivoted at 45 between the ears 46 of a handle bar 47, which is affixed as by a pin 48 to the forward projecting end of the shaft 34.

Figure 3:
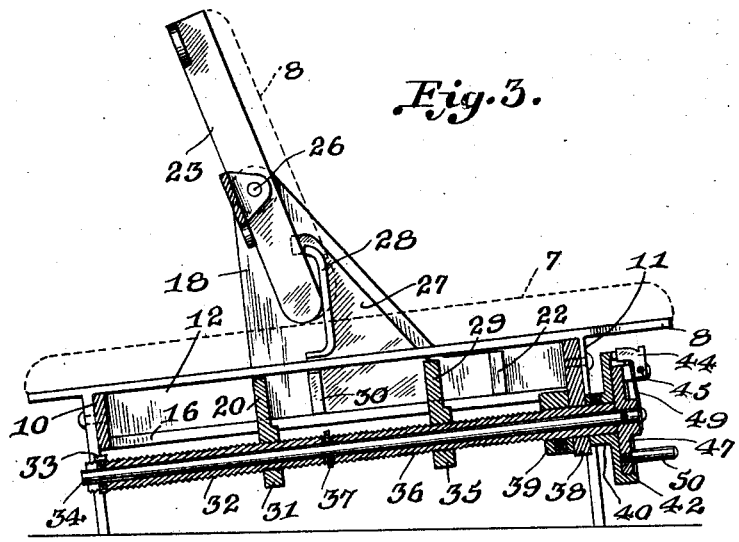
Figure 3 is a longitudinal section taken on the line 3—3 in Figure 2.
Figure 4:
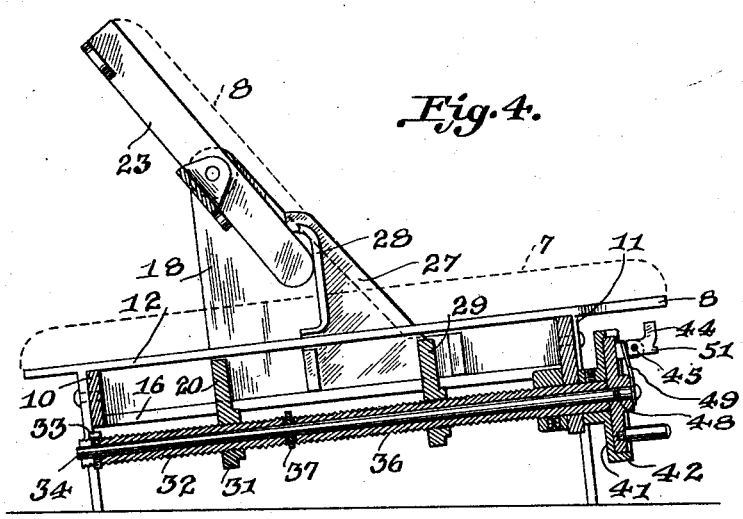
Figure 4 is a similar view with the parts shown in a subsequent position.

The handle bar 47 rests against the disc and within the rim or flange 42 thereof. The dog 44 is of angle form and it is held either in the locking position, shown in Figure 3, or the inoperative position, shown in Figure 4, by a flat spring 49 carried by the end of the shaft 34. A handle 50 is carried by the handle bar 47.

The seat 7 and its frame remains stationary, while the back 8 and its supporting parts may be shifted longitudinally with respect to the seat 7 so as to give a deeper seat area and more or less leg room and the back 8 may also be adjusted angularly about the pivots 26 to give the desired tilt thereto.

When the clutch or dog 44 is engaged, rotation of the handle 50 will communicate rotation to both sleeves 32 and 36 thus causing both traveling nuts 31 and 35 to shift axially along the shaft either forwardly or backwardly in accordance with the direction of rotation. In this way the back 8 may be moved forwards or backwards along the seat 7. If the clutch 44 is pulled outwardly, as by engaging the thumb or finger with the finger hold 51, then rotation of the handle 50 will impart rotation only to the threaded sleeve 32 and not to the threaded sleeve 36. As a consequence the adjusting members 27 will remain stationary, while the back frame members are moved toward or from the adjusting members. As the seat back members engage the adjusting members, the angle of the seat will be varied due to this relative movement.

It is obvious that various changes and modifications may be made in the details of construction and design of the above specifically described embodiment of this invention without departing from the spirit thereof, such changes and modifications being restricted only by the scope of the following claims.

What is claimed is:—

1. An improved adjustable seat comprising a seat frame, a back frame movable thereon, a pivoted back on the back frame, an adjusting member moving relatively to the back frame for holding the back at a desired angle on the back frame, traveling nuts carried by said back frame and said adjusting member, a screw shaft on the seat frame for engaging the traveling nut of said back frame, a screw sleeve loose on said shaft and engaging the nut of the adjusting member, a handle for rotating said shaft, and a releasable clutch between said shaft and sleeve.

2. An adjustable seat comprising a seat frame, a back frame movable with respect to the seat frame, a back pivoted on the back frame, an adjusting member movable relatively to the back frame and seat frame for holding the back at a desired angle on the back frame, traveling nuts carried by said back frame and said adjusting member, a screw shaft journaled in the seat frame for engaging the traveling nut of said back frame, a screw sleeve loose on said shaft and engaging the nut of the adjusting member, means to rotate the shaft without rotating the sleeve, and means between the shaft and sleeve whereby the same may be rotated simultaneously.

MARION GUSTINE ALLGEYER.